United States Patent Office 3,061,234
Patented Oct. 30, 1962

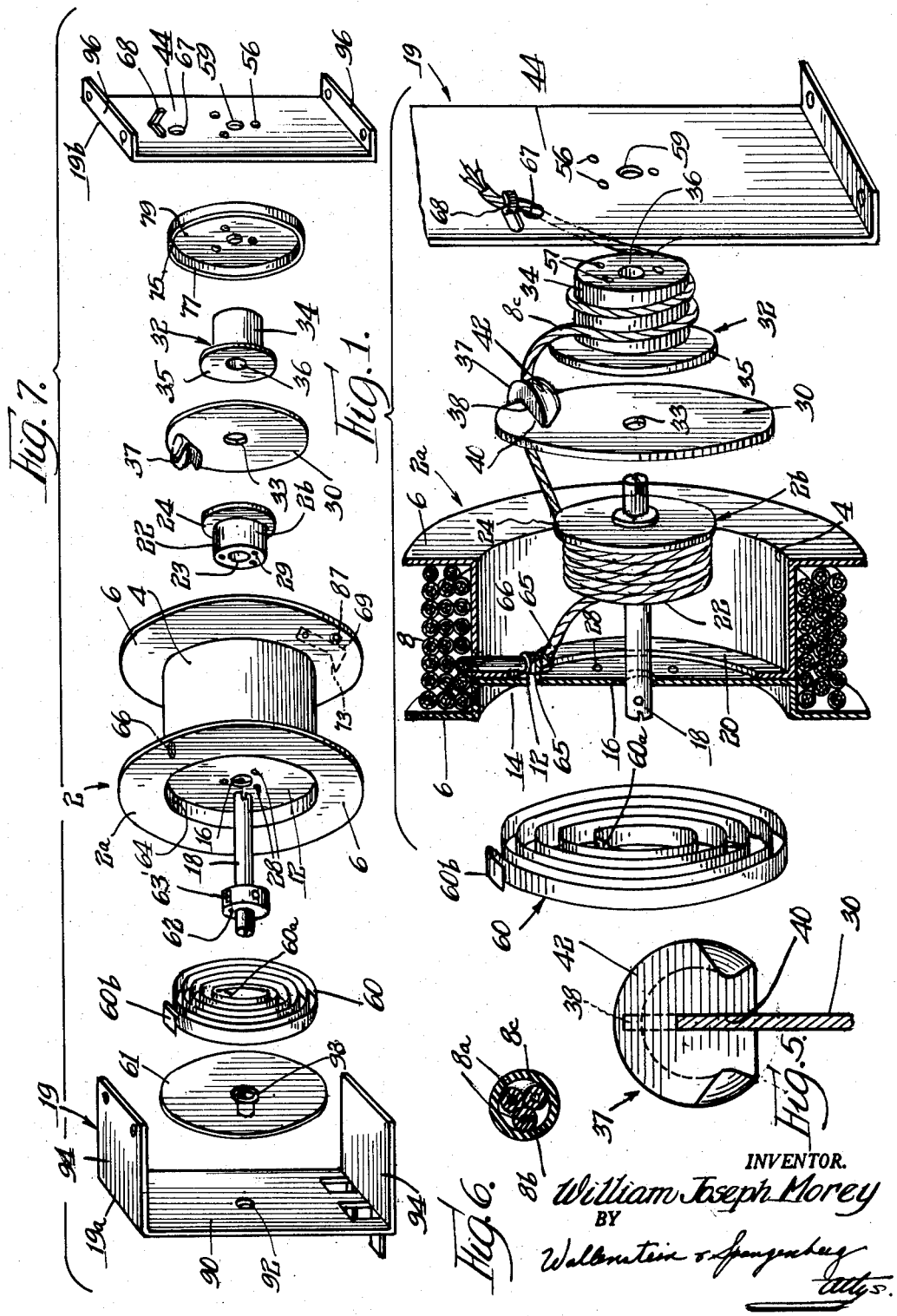

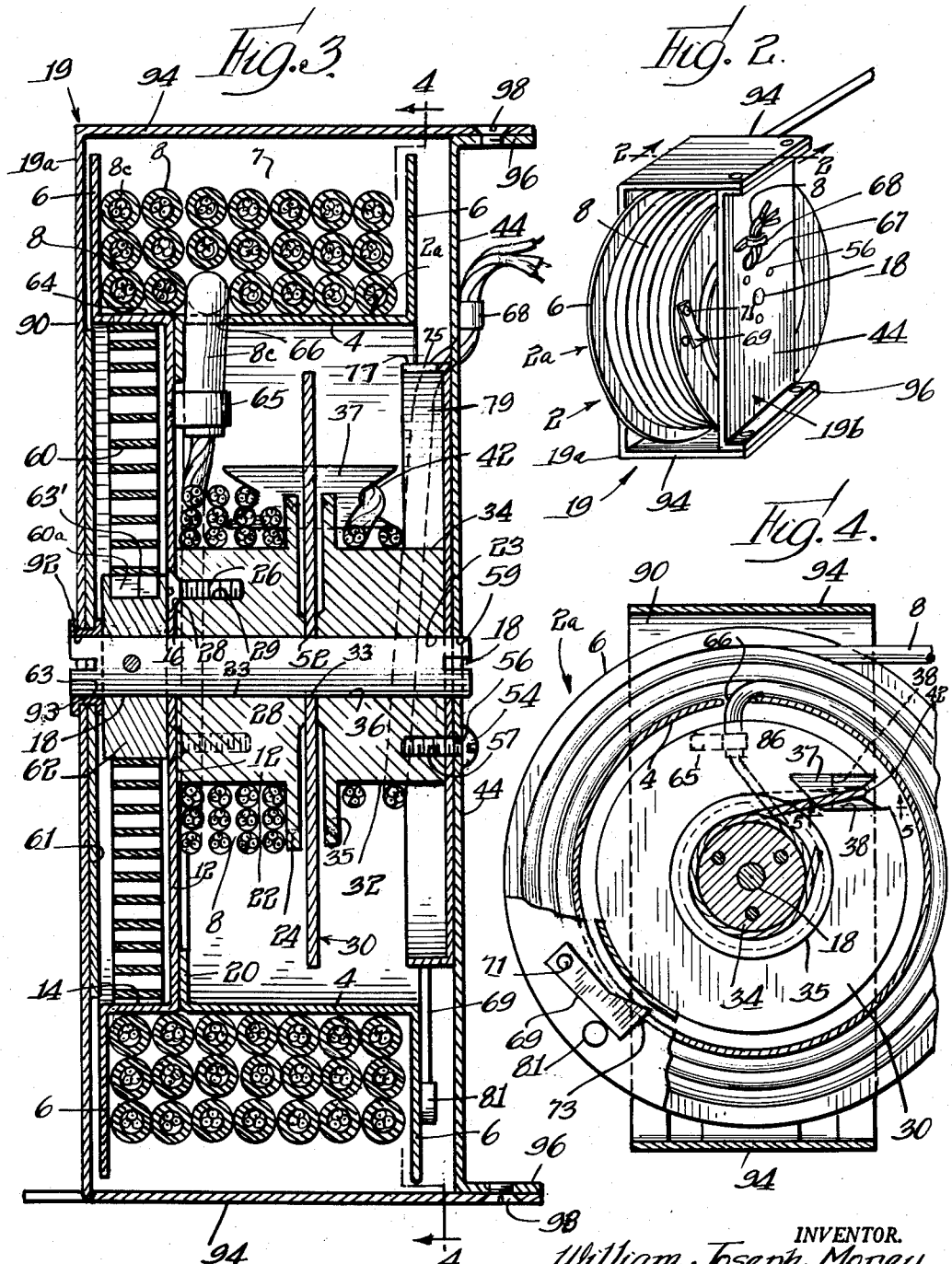

3,061,234
RETRACTABLE CONDUCTOR CORD REEL
ASSEMBLY
William J. Morey, Chicago, Ill., assignor to The Morey Corp., Chicago, Ill., a corporation of Illinois
Filed May 23, 1960, Ser. No. 31,111
5 Claims. (Cl. 242—107.1)

The present invention relates to a reel assembly for gathering in and paying out electrical power or other conductor cords of portable electrical appliances, machine tools and other electrical devices where it is desirable to move the devices about during use. More particularly, the present invention relates to a conductor cord reel assembly which automatically pays out or takes up the slack in a conductor cord, as the position of the operating electrical device involved is varied.

The usual construction of retractable conductor cord reels employs a brush and slip ring for each conductor of the cord to establish an electrical circuit during the winding or unwinding of the cord upon or from the reel involved. This construction is frequently found to be objectionable from the standpoint of excessive contact resistance, sparking, maintenance of the brushes, and excessive brush friction, particularly where a large number of conductors is involved. Generally the reels are spring loaded so that release of pressure on the cords automatically results in the rewinding of the cords on the reels. Where a larger than normal number of conductors per cord is involved, the friction between the brushes and slip rings could readily overcome the restoring force of the springs so as to interfere with the rewinding of the cords on the reels. This places a low practical limit on the number of conductors per cord which can be effectively handled by these reels.

Other types of retractable conductor cord reels have heretofore been proposed with varying degrees of success.

It is one of the objects of the present invention to provide a retractable conductor cord reel assembly for paying out or gathering in a conductor cord which avoids the need for brushes and slip rings and which is of a relatively simple and compact construction.

A more specific object of the present invention is to provide a retractable conductor cord reel assembly of a type which includes: a rotatably mounted storage unit reel having a first portion around which the major portion of the conductor cord is wound and a second portion around which an inner portion of the conductor cord is wound in a given direction; a relatively stationary take-up spool or drum around which the inner end of the inner portion of the conductor cord is wound in a direction opposite to said first mentioned direction; a conductor transfer and guiding means between said second portion of the storage reel and the take-up drum and rotatably mounted with respect to the storage reel unit and receiving a portion of the conductor cord extending between the second portion of the storage reel unit and the take-up drum, the conductor transfer and guiding means being adapted to transfer the cord between the drum and the second portion of the storage reel unit upon rotation of the storage reel unit; and spring means adapted to be tensioned when the conductor cord is unwound from the storage reel unit; and wherein the assembly comprises a minimum number of parts which occupy a relatively small amount of space and which are easy to assemble and disassemble. A related object of the present invention is to provide a retractable cord reel assembly as just described wherein the aforesaid spring means comprises a single spring member positioned on an outside portion of the assembly where space is not at a premium. Another related object of the present invention is to provide a retractable conductor cord reel assembly as just described wherein the spring member is a spiral spring and the relationship thereof to the rest of the reel assembly is such that a maximum number of turns of the storage reel can be accommodated for a spiral spring of a given size and length.

Still another related object of the present invention is to provide a conductor cord reel assembly as just described wherein the first aforesaid portion of the storage reel unit occupies substantially the full length of the assembly, and the rest of the operating components thereof are located within the storage reel to provide an assembly of maximum cord capacity for a given sized reel assembly.

In accordance with the most preferred form of the invention, the aforesaid storage reel unit comprises an outer cylindrical portion upon which is wound the major portion of the conductor cord, and an inner cylindrical portion of much smaller diameter and concentrically arranged within the outer portion and around which the inner end portion of the conductor cord is wound in a given direction. The storage reel unit is mounted for rotation upon a shaft to which is affixed the aforesaid cord transfer and guiding means located between the take-up drum and the inner portion of the storage reel unit. The cord transfer and guiding means includes a generally axially extending guideway through which the inner portion of the conductor cord freely passes between the inner portion of the storage reel unit and the stationary take-up drum. With this arrangement, the aforesaid spring member can be mounted along the same side of the take-up drum and the inner portion of the storage reel unit where it may be readily secured between the shaft and another portion of the assembly with respect to which the shaft rotates. When the storage reel unit is rotated in a direction to unwind the conductor cord therefrom, the spring member is tensioned as it opposes the unwinding of the cord and imparts rotation to the shaft so that the aforesaid conductor transfer and guiding means is rotated in the same direction as, but at a slower speed of rotation than, the storage reel unit. The conductor transfer and guiding means effects the transfer of the cord between the take-up drum and the inner portion of the storage reel unit so as to prevent any slack in the cord.

To obtain maximum compactness and storage capacity for a given sized reel assembly, the spring member, the inner portion of the storage reel unit, the conductor cord transfer and guiding means and the take-up drum are all located within the outer portion of the storage reel unit so that substantially the entire length of the reel assembly is used for storing the conductor cord. As it is apparent from the construction of the reel assembly just described, the outer end of the portion of the conductor cord on the take-up drum remains stationary even while the storage reel is being rotated.

To maintain tension on the internal portion of the conductor cord in addition to a retractive force on the storage reel, the inner end of the spring member, which is preferably a spiral spring, is attached to the aforesaid shaft carrying the conductor cord transfer and guiding means, and the outer end of the spring to either the storage reel or to a stationary part of the assembly. With either of these arrangements, the spring makes a minimum number of revolutions during the winding or unwinding of a given length of conductor cord from the storage reel and the size and length of the spring member is minimized.

Other aspects of the invention relate to the constructional details of the components making up the assembly and to the specific relationships therebetween.

Other objects, advantages and features of the invention will thus become apparent by making reference to the specification to follow, the claims and the drawings wherein:

FIG. 1 is a perspective, exploded view, partly broken away, of the basic elements making up a preferred form of the present invention;

FIG. 2 is a perspective view of an assembled conductor cord reel assembly including the components shown in FIG. 1;

FIG. 3 is an enlarged vertical sectional view through the reel assembly shown in FIG. 2, taken substantially along section line 2—2 therein;

FIG. 4 is a transverse sectional view through the reel assembly of FIG. 3, taken substantially along section line 4—4 therein;

FIG. 5 is a longitudinal fragmentary sectional view through the reel assembly of FIG. 4, taken substantially along section line 5—5 therein;

FIG. 6 is a greatly enlarged transverse section through the conductor cord; and

FIG. 7 is an exploded view of substantially all the components making up the reel assembly shown in FIGS. 2 through 4 with the conductor cord removed therefrom.

The preferred form of the present invention includes a storage reel having a main outer shell or body member 2a having a peripheral cylindrical wall 4 from the margins of which outwardly extend radial flanges 6—6 defining a channel-shaped peripheral storage space 7 for an electrical power cord 8. A circular end wall 12 extends across the inside of the cylindrical wall 4 at a point preferably spaced axially inwardly of the adjacent flange 6 to form a spring-receiving well 14. The end wall 12 has a central hole 16 which receives one end of an axially extending shaft 18 rotatably mounted upon a casing or frame 19. The storage reel unit 2 is rotatably mounted upon the shaft 18. The outer reel member 2a may be made in any suitable way. As illustrated, one of the flanges 6 and a major portion of the length of the wall 4 are formed from one sheet metal stamping and the remainder of the wall 4, the end wall 12 and the other flange 6 are made from another sheet metal stamping which is cup-shaped. The former sheet metal stamping has an inwardly extending flange 20 which makes face-to-face engagement with one side of the end wall 12 of the latter sheet metal stamping, the flange 20 being welded or otherwise secured to the end wall 12 to form an integral outer storage reel member.

The storage reel unit 2 further includes what is sometimes referred to as an inner portion 2b which is made of a member having a cylindrical body 22 with a central axial bore 23 extending therethrough which rotatably receives shaft 18 and an outwardly extending flange 24 at the right hand end thereof. The inner reel member 2b is secured in any desirable manner for rotation with the outer reel member 2a. For example, as illustrated, the inner reel member 2b is mounted upon the inner side of the end wall 12 by screws 26 passing through openings 28 in the end wall 12 and threading into threaded holes 29 formed in the cylindrical body 22 of the inner reel member 2b. The diameter of the cylindrical body 22 is substantially smaller than the diameter of the outer reel member 2a and is coaxially related thereto.

The axial length of the inner reel member 2b is substantially shorter than the distance between the end wall 12 and the right hand end of the outer reel member 2a so as to accommodate a circular carrier disc 30 and a take-up spool or drum 32. The carrier disc has a central opening 33 for receiving shaft 18 with a force fit so that the carrier disc is fixed upon the shaft 18 for rotation therewith. Obviously, the disc 30 may be fixedly secured to the shaft 18 by means other than by a force fit. The take-up drum 32 has a cylindrical body 34, a central axial bore 36 which rotatably receives the shaft 18 and a flange 35 at the left hand end thereof.

The carrier disc 30 has a diameter which is substantially larger than the diameter of the flange 24 of the inner reel member 2b and it carries at the perimeter thereof a cord transfer and guiding means generally indicated by reference numeral 37 which may take a variety of forms. For example, it could be a pulley which is rotatably mounted on the carrier disc 30 or, as illustrated, may comprise a segmental cylindrical member carried within a slot 38 extending from the perimeter of the carrier disc 30 at an angle to a radial line. The segmental cylindrical member has a radial slit 40 formed therein of a size frictionally to receive the portion of the carrier disc 30 located beyond the end of the disc slot 38, and a peripheral groove 42 therein forming an inwardly curved guideway having a medial plane extending generally tangentially (FIG. 4) of the flanges 24 and 35. It is apparent that the carrier disc 30 serves as a carrier for the cord transfer and guiding means 37 and, therefore, could be replaced by a radial arm or the like.

The take-up drum 32 is anchored to the end wall 44 of the casing or frame 19 for the reel assembly in a suitable way, such as by screws 54 passing through holes 56 in the end wall 44 and threading into threaded holes 57 formed in the end of the cylindrical body 32 of the drum. The end wall 44 has a central opening 59 through which the end of the shaft 18 passes.

The reel unit 2 is spring biased in a direction which winds the cord thereupon most advantageously by means of a single, flat, spiral spring 60. Most advantageously, the spiral spring is located within the well 14 formed at the left hand end of the reel unit 2. The well is closed off by a stationary disc or cover plate 61 having a central opening 63 through which the shaft 18 passes. The spring has an inner end 60a secured to the shaft 18. In the illustrated embodiment of the invention, the shaft 18 carries a sleeve 62 which has a slot 63' therein into which the inner spring end 60a is hooked to anchor the same thereto. The outer turn of the spring 60 is located adjacent the peripheral wall 4 of the outer reel member 2a and is anchored thereto, as by inserting a hooked outer end portion 60b thereof into a slot 64 formed in the peripheral wall 4 of the outer reel member 2a.

The conductor cord 8 may take a variety of forms, but, as illustrated, it includes three electrical conductors 8a each surrounded by suitable insulation 8b which may be a waxy or other smooth slippery material. The insulated conductors are twisted together and are encased in a main outer cable insulation sheathing 8c to form an integral cord unit. As previously indicated, the major portion of the conductor cord is wound around the outer reel member 2a and in a direction which causes increasing tension in spiral spring 60 when the cord is unwound from the reel. The inner end portion of the cord is passed through an opening 66 in the wall 4 of the outer reel member 2a where it is anchored in place against the end wall by a locking tab 65 on the end wall 12. The outer insulation 8c of the cord 8 may be stripped from the conductor cord at a point a short distance beyond the locking tab 65 to provide a more compact inner extension of the cord. The twisted insulated conductors which extend beyond the cutoff end of the outer insulation 8c winds around the cylindrical body 22 of the inner reel member 2b in a given direction, which, as illustrated, is a clockwise direction as viewed from the right hand end of the reel assembly. The twisted insulated conductors then extend around the inner defining walls of the peripheral groove 42 in the cord transfer and guiding means 37 secured to the outer extremity of the carrier disc 30. The twisted conductors then wind around the cylindrical body 34 of the take-up drum 32 in a direction opposite to the direction in which the twisted insulated conductors wind around the cylindrical body 22 of the inner reel member 2b. The outer end portions of the twisted insulated conductors then pass through a hole 67 in the casing end wall 44 where they are held in place by means of a tab or the like 68 struck from the end wall 44.

Means are preferably provided for locking the storage reel unit 2 into a given angular position. This means includes a latch 69 freely pivoted at 71 to the right hand flange 6 of the outer reel member 2a. The latch 69 has a pointed free end 73 which, under force of gravity, is adapted to fall into a reel-locking position within a slot 75 formed in the peripheral wall 77 of a cup-shaped member 79 anchored to the casing end wall 44 by the screws 54, when the reel unit is held in a position where the latch is above the slot 75. The spring tension maintains the latch in a locked position. Stop post 81 prevents the latch from pivoting into a position where the pointed end 73 faces away from the member 79. When the reel is rotated in a direction to unwind the cord from the reel unit, the latch rotates in a direction which removes the latch from the slot 75 and release of the cord will result in rotation of the reel which will keep the latch out of the slot 75 by centrifugal force.

The casing or frame 19 may take any one of a number of forms. In the embodiment illustrated in the drawings, it comprises two parts 19a and 19b. The casing part 19a has a vertical end wall 90 having an opening 92. A sleeve bearing 93 is anchored in the opening 92 of the end wall 90 and the opening 63 in the cover plate 61, and the shaft 18 extends into and is journaled in the bearing 93.

The casing part 19a has upper and lower arms 94—94 between which the reel unit 2 is located. The other casing part 19b has a pair of outwardly extending flanges 96—96 adapted to make face-to-face contact with the inner surfaces of the arms 94—94 of the casing part 19a, and the flanges 96—96 are secured to the arms 94—94 by any suitable means, such as by screws 98.

The operation of the reel assembly of the present invention is as follows:

When the user desires to unwind the cord 8 from the reel unit 2, he pulls on the end of the cord to effect the clockwise rotation of the reel unit as viewed from the right hand end thereof. This pays out the twisted insulated conductors from the inner reel member 2b, and tenses the coil spring 60 which effects a clockwise rotation of the shaft 18. The resultant clockwise rotation imparted to the cord transfer and guiding means 37 rewinds part of the payed out portion of the twisted insulated conductors onto the cylindrical body 22 of the inner reel member 2b and winds the rest of the unwound insulated conductors upon the take-up drum 32. The cord transfer and guiding means 37 thus turns a lesser amount than the reel unit, and the coil spring 60 is thus placed under greater tension. When the reel unit 2 is allowed to rotate in a direction to rewind the cord on reel 2, the twisted conductors are transferred from the stationary take-up drum 32 to cylindrical body 22 of the inner reel member 2b. The winding and unwinding of the twisted conductors requires a longitudinal movement of the conductors in the peripheral groove 42 of the rotating transfer and guiding means 37. This longitudinal movement is readily effected by the free sliding movement of the smooth slippery insulation 8b of the twisted conductors against the defining walls of the groove 42. The portion of the conductors leaving the groove 42 extend generally tangentially of the flanges of the inner reel member 2b and the take-up drum 32, which minimizes the tendency of the conductors to ride up the sides of the groove 42.

The particular arrangement of the parts of the reel assembly of the present invention provides a very compact and simply constructed reel assembly which, due to the absence of slip rings, is usable with cords of a suitable length and diameter having large numbers of conductors. Note that in the preferred form of the invention the outer reel member 2a occupies substantially the full length of the reel assembly so that a maximum amount of cord can be accommodated in a given space. Also, only a single coil spring 60 is required. Moreover, the spring is located within the confines of the outer reel member where it can be readily connected between the shaft 18 and the outer reel member. Since the shaft 18 and the outer reel member both rotate in the same direction (but at different rates of rotation), a given sized spring accommodates a maximum number of turns of the storage reel. The location of the spring 60 on the side rather than within the central portion of the reel assembly is advantageous because it simplifies assembly of the parts and places the spring at a location where space is not at a premium.

It should be understood that numerous modifications may be made of the preferred embodiment of the invention described above without deviating from the broader aspects of the invention.

What I claim as new and desire to protect by Letters Patent of the United States is:

1. A retractable conductor cord reel assembly comprising: a frame, a shaft rotatably mounted on said frame, storage reel means rotatably supported with respect to said shaft, said storage reel means having a first portion around which the main portion of a conductor cord is wound in a first direction, and a second portion around which the inner end portion of said conductor cord is wound in the opposite direction, a take-up drum secured to said frame adjacent to but spaced from one end of said second portion of said storage reel means, cord transfer and guiding means supported for rotation with said shaft between said take-up drum and the second portion of said storage reel means, said cord transfer and guiding means providing a generally axially extending guideway through which the inner end portion of said conductor cord passes between said inner portion of said storage reel means and said take-up drum where the cord is wound in said first direction, and a spring on the same side of said take-up drum and the second portion of said storage reel means, and said spring having one end secured to said shaft and another end secured to said storage reel means and being placed under tension when the conductor cord is unwound from said first portion of said storage reel means to effect rotation of said shaft and cord transfer and guiding means and transfer the cord between said take-up drum and said second portion of said storage reel means.

2. A retractable electrical conductor cord reel assembly comprising: a frame, storage reel means having an outer portion around which the main outer section of an insulated conductor cord is wound in a first direction and an inner portion located within said outer portion and around which an inner extension of said insulated conductor cord is wound in the opposite direction, a shaft rotatably mounted on said frame and around which said storage reel means is mounted for rotation with respect thereto, carrier means within said outer reel portion adjacent to one side of said inner portion of said storage reel means and connected to said shaft for rotation therewith, a take-up drum fixedly mounted on said frame, said take-up drum being mounted adjacent to the side of said carrier means opposite the side nearest said inner portion of said storage reel means, said carrier means having adjacent the outer extremity thereof conductor transfer and guiding means forming a narrow, inwardly curving, axially-extending channel located radially outwardly of the said inner portion of said storage reel means and said take-up drum, said inner extension of said insulated conductor cord extending around the inner defining walls of said channel and freely movable longitudinally therein and then winding around said take-up drum in a direction opposite to the direction in which the cord is wound around said inner portion of said storage reel means, and a spiral spring located within said outer portion of said storage reel means and having an inner end anchored to said shaft and an outer end anchored to said storage reel means to oppose unwinding of the cord from the storage reel means, said carrier means and the conductor cord transfer and guiding means carried thereby rotating at a slower rate than said storage reel means upon winding or unwinding of the conductor cord therefrom and transferring windings of said electrical cord unwinding from said take-up drum to said second portion of said storage reel means or vice versa.

3. A retractable electrical conductor cord reel assembly comprising: a frame, storage reel means having an outer portion around which the main outer section of an insulated conductor cord is wound and an inner portion located within said outer portion and around which an inner extension of said insulated conductor cord is wound, a shaft rotatably mounted on said frame and around which said storage reel means is mounted for rotation with respect thereto, carrier means within said outer reel portion adjacent to one side of said inner portion of said storage reel means and connected to said shaft for rotation therewith, a take-up drum fixedly mounted on said frame, said take-up drum being mounted adjacent to the side of said carrier means opposite the side nearest said inner portion of said storage reel means, said carrier means having adjacent the outer extremity thereof conductor transfer and guiding means forming a narrow, inwardly curving, axially-extending channel located radially outwardly of the said inner portion of said storage reel means and said take-up drum, said inner extension of said insulated conductor cord extending around the inner defining walls of said channel and freely movable longitudinally therein and then winding around said take-up drum in a direction opposite to the direction in which the cord is wound around said inner portion of said storage reel means, and a spiral spring located within said outer portion of said storage reel means and having an inner end anchored to said shaft and an outer end fixed to a point of the reel assembly which places the spring under tension when the conductor cord is unwound from said outer portion of said storage reel means, said carrier means and the conductor cord transfer and guiding means carried thereby rotating at a slower rate than said storage reel means upon winding or unwinding of the conductor cord therefrom and transferring windings of said electrical cord between said take-up drum and said second portion of said storage reel means.

4. A retractable electrical conductor cord reel assembly comprising: a frame, a shaft rotably mounted on said frame, storage reel means rotably supported upon and with respect to said shaft, said storage reel means having an outer cylindrical shell portion around which a conductor cord is wound and an inner cylindrical portion of much smaller diameter than and concentrically arranged within said outer shell portion and around which the inner end portion of said conductor cord is wound in a first direction, a cylindrical take-up drum secured to said frame and positioned within the outer shell portion of said storage reel means adjacent to but spaced from one end of said inner portion of said storage reel means, cord transfer and guiding means supported for rotation with said shaft between said take-up drum and the inner portion of said storage reel means, said cord transfer and guiding means providing a generally axially extending guideway through which the inner end portion of said conductor cord passes between said inner portion of said storage reel means and said take-up drum where the cord is wound in the opposite direction from said first direction, and a spring located on the same side of said take-up drum and the inner portion of said storage reel means, and said spring having one end secured to said shaft and the other end being fixed to a point of the reel assembly which places the spring under tension when the conductor cord is unwound from said outer shell portion of said storage reel means and effecting rotation of said shaft and cord transfer and guiding means at a slower rate of rotation than said storage reel means, to transfer portions of said conductor cord between said take-up drum and said inner portion of said storage reel means.

5. A retractable electrical conductor cord reel assembly comprising: a frame, a shaft rotatably mounted on said frame, storage reel means rotatably supported upon and with respect to said shaft, said storage reel means having an outer cylindrical shell portion around which a conductor cord is wound in one direction and an inner cylindrical portion of much smaller diameter than and concentrically arranged within said outer shell portion and around which the inner end portion of said conductor cord is wound in the opposite direction, a cylindrical take-up drum secured to said frame and positioned within the outer shell portion of said storage reel means adjacent to but spaced from one end of said inner portion of said storage reel means, cord transfer and guiding means supported for rotation with said shaft between said take-up drum and the inner portion of said storage reel means, said cord transfer and guiding means providing a generally axially extending guideway through which the inner end portion of said conductor cord passes between said inner portion of said storage reel means and said take-up drum where the cord is wound in said one direction, and a spiral spring located within said outer shell portion of said storage reel means on the same side of said take-up drum and the inner portion of said storage reel means, and said spiral spring having its inner end secured to said shaft and the outer end secured to said outer shell portion of said storage reel means to oppose unwinding of the cord from the storage reel means and being placed under tension when the conductor cord is unwound from said outer shell portion of said storage reel means and effecting rotation of said shaft and cord transfer and guiding means at a slower rate of rotation than said storage reel means, to transfer portions of said conductor cord between said take-up drum and said inner portion of said storage reel means.

References Cited in the file of this patent

UNITED STATES PATENTS

| | | |
|---|---|---|
| 1,322,407 | Chegwidden et al. | Nov. 18, 1919 |
| 2,605,977 | Gleason | Aug. 5, 1952 |